(12) United States Patent
Vicario

(10) Patent No.: US 6,378,781 B1
(45) Date of Patent: Apr. 30, 2002

(54) EXIT AREA CONTROL MECHANISM FOR CONVERGENT DIVERGENT NOZZLES

(75) Inventor: Javier Elorriaga Vicario, Getxo (ES)

(73) Assignee: Industria de Turbo Propulsores S.A., Zamudio (ES)

( * ) Notice: Subject to any disclaimer, the term of this patent is extended or adjusted under 35 U.S.C. 154(b) by 0 days.

(21) Appl. No.: 09/568,014

(22) Filed: May 10, 2000

(30) Foreign Application Priority Data

May 13, 1999 (EP) .............................................. 99500079

(51) Int. Cl.[7] .............................................. F02K 1/00

(52) U.S. Cl. .................................... 239/265.39; 60/271

(58) Field of Search .............. 60/271, 242; 239/265.33, 239/265.37, 265.39

(56) References Cited

U.S. PATENT DOCUMENTS

| | | | | |
|---|---|---|---|---|
| 6,067,793 A | * | 5/2000 | Urrela et al. .................. | 60/230 |
| 6,098,400 A | * | 8/2000 | Estevas-Guilmain ......... | 60/232 |
| 6,102,307 A | * | 8/2000 | Elorriaga et al. ...... | 239/265.39 |

* cited by examiner

Primary Examiner—Charles G. Freay

(57) ABSTRACT

A convergent-divergent nozzle with an exit area control mechanism includes convergent and divergent petals extending from a nozzle structure on which a synchronising ring is allowed to rotate and to move in a radial direction. Angled lever arms pivot on the nozzle structure and extend from the synchronising ring to compression struts that connect with the divergent petals so that, when the synchronising ring rotates around the nozzle structure, the rotation is converted by the angled lever arms into a predominantly axial displacement of the compression struts, resulting in opening or closure of the divergent petals.

7 Claims, 3 Drawing Sheets

EXIT AREA CONTROL MECHANISM FOR CONVERGENT DIVERGENT NOZZLES

BACKGROUND OF THE INVENTION

1. Field of the Invention

The invention herein consist of a control mechanism for the exit area of convergent-divergent nozzles. The mechanism allows the control of the nozzles exit area in convergent-divergent axisymmetric nozzles, independently of the throat area and is specially design for gas turbine engines used as aircraft propulsion systems.

The invention consists of a nozzle structure (2), on which a synchronising ring (1) is allowed to rotate and to move in the axial direction. Angled lever arms (3) with pivoting capability (4) on the nozzle structure (2), are connected on one side to the synchronising ring (1) and on the other to compression struts (8), joined to the divergent petals (10). The rotation of the synchronising ring (1) around the nozzle structure (2) is converted by the angled lever arms (3) in a predominant axial displacement of one side of the compression struts (8), resulting in the opening or closure of the divergent petals (10).

This mechanism, because of being able to control the exit area of the nozzle can achieve an increased number of optimised point in the aeroplane flying envelope.

2. Description of the Related Art

A gas engine propulsion system produces an axial thrust by momentum change of the high speed exiting gases though the aeroplane exit nozzle. The air enters the engine though the compressor where it is compressed. It is then heated by fuel combustion. The hot exiting gas is expanded in the turbine, obtaining work which is used to drive the mentioned compressor. The gas expansion continues in the nozzle, where the remaining energy on the gas is converted into a high velocity stream, responsible for the engine thrust.

The nozzles currently employed in aeroplanes can be divided in the following groups, attending to their complexity. In civil aviation, it is usual to have convergent nozzles with a fix ratio between entering and throat areas. In military engines with reheat capability, it is necessary to have a system that can allow the change in throat area. Some engines have a divergent section after the convergent, which can continue the gas expansion above sonic velocities, achieving an increased thrust and a reduction in specific fuel consumption. Most of the convergent- divergent nozzles have a single degree of freedom, so that for each throat area the exit area is determined based on the length of the petals and compression struts. The mentioned dimensions and the relation between throat and exit areas is determined as the best fit curve of ideal ratios, which are a function of cruise height and mach number for a stationary flight. Choosing a single area law means that for some flying conditions the thrust or specific fuel consumption can be penalised by as much as 5% of total engine thrust.

SUMMARY OF THE INVENTION

The present invention describes a mechanism capable of changing the exit area independently of the throat area, allowing the optimisation of thrust in all flying conditions, without a significant weight increment or an unreliable failure mode.

Both convergent and divergent sections are made up of independent petals that once installed work simultaneously.

The convergent petals are mounted individually through a cylindrical joint on the exit perimeter of the engine. The divergent petals are joined by a cylindrical joint to the rear end of the convergent petals. Each of the divergent petals is joined to a compression strut. Usually this compression strut is joined on its other end to the nozzle structure. All four joints are parallel to each other and perpendicular to the nozzle axis, such that each set of petals and strut make up a four link mechanism. The actuation of the mechanism generally consists of the rotation of the convergent petal around its joint with the engine structure. This four link mechanism allows the variation of the throat and exit areas simultaneously, with a single degree of freedom, upon a fixed ratio determined by the length of the elements that make it up.

The present invention introduces a mechanism between the strut and the engine structure that can vary the axial distance between them gaining an additional degree of freedom in the four link mechanism petal arrangement allowing the control of the exit area independently of throat area. The mechanism therefore allows the optimum expansion of the exit gases and optimum thrust, in other words an increased number of optimised flying conditions.

According to the invention, the exit area control mechanism for convergent- divergent axisymmetric nozzles, consist of a synchronising ring, concentric with the nozzle axis, which is joint to a group of lever arms that pivot around a preferably radial axis around the nozzle structure, determining the axial position of a group of struts that are joined at one end to the end of the mentioned lever arms and on the opposite end to a group of divergent petals, such that for every circumferential position of the synchronising ring the exit area of the axisymmetric nozzle is determined.

BRIEF DESCRIPTION OF THE DRAWINGS

These main advantages and other features and benefits will be more easily understood in the following description together with the appended drawings, in which the arrangement of the exit area control mechanism, according to the principles of the invention has been represented as a non limiting example.

In the drawings.

DETAILED DESCRIPTION OF THE INVENTION

Figure 1:
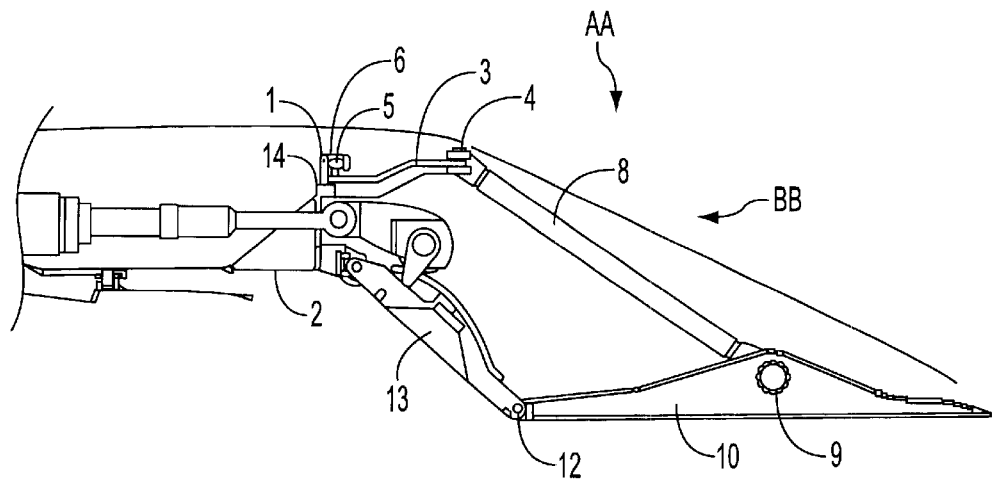
FIG. 1 is a cross section of a closed convergent divergent nozzle with the invention mechanism.
Figure 2:
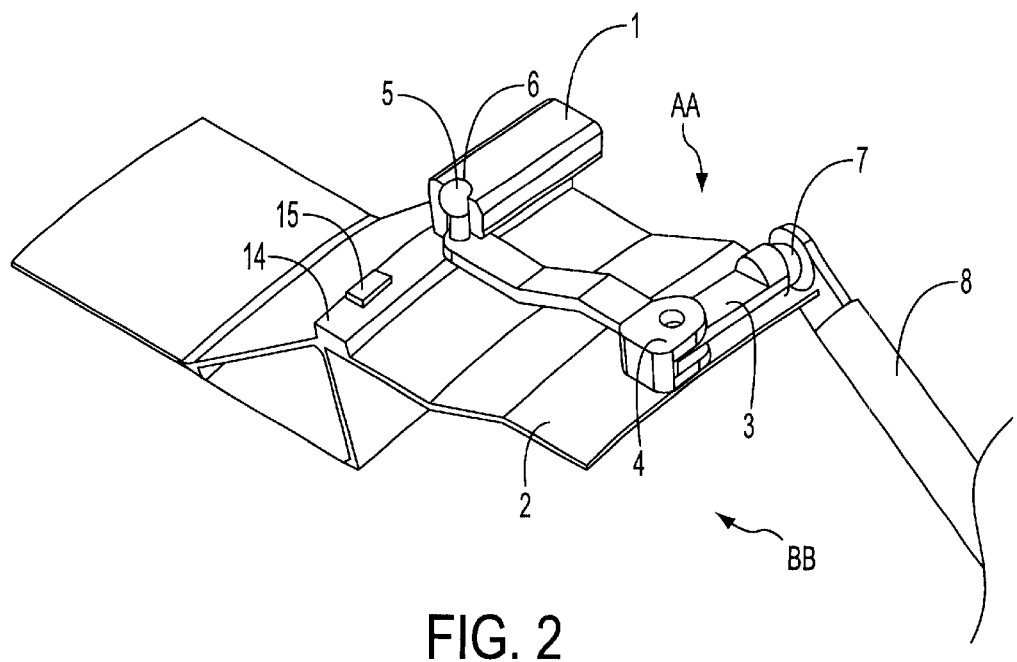
FIG. 2 is an isometric view with the invention mechanism preferred configuration.

The purpose of the invention is a mechanism that can control the exit area of an axi-symmetric convergent divergent nozzle independently of the throat area, in gas turbine propulsion system.

The preferred configuration consists of a synchronising ring (1) that can rotate and displace axially around the nozzle structure (2). Angled lever arms (3), attached to the nozzle structure (2) by a cylindrical joint (4), are connected at one end, preferably by spherical end (5) on cylindrical surface (6), to the synchronising ring (1) and on the other end, preferably by spherical joint (7) to the compression struts (8), which in turn are joined, preferably by spherical joint (9) to the divergent petals (10). An actuation system (11) is responsible of the rotation of the synchronising ring (1).

The actuation system (11), which is joined at one end to the synchronising ring (1) and on the other side to the nozzle structure (2), demands a rotation of the synchronising ring (1) around the nozzle structure (2). This rotation is converted, with the aid of the angled lever arms (3) into a primarily axial displacement on the end of the compression struts (8), forcing the rotation of the divergent petals (10) around their cylindrical joint (12) with the convergent petals (13), and therefore modifying the nozzle exit area.

Figure 3:
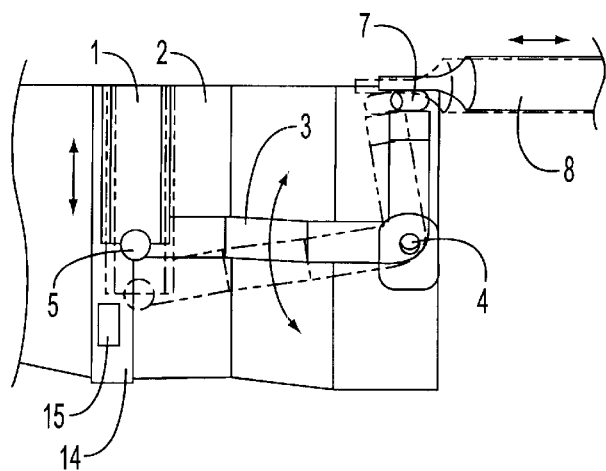
FIG. 3 is a view according to arrow AA of FIG. 1 of the invention mechanism.
Figure 4A:
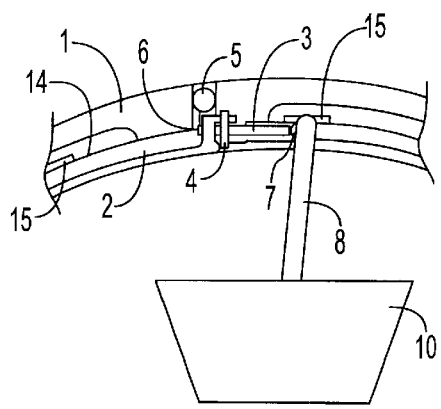
FIGS. 4a and 4b are views according to arrow BB of the invention mechanism, in which the relative movement between the spherical end (5) and the synchronising ring (1) can be observed.
Figure 4B:
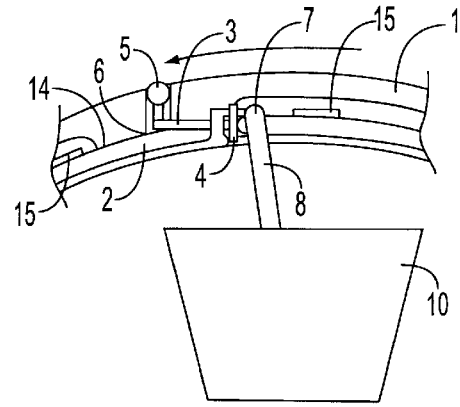

To allow the simultaneous rotation of the synchronising ring (1) and the angled lever arms (3) while remaining in contact, it is necessary to solve the axial displacement between them, which is caused by the absence of collinearity of their rotation axis. This displacement explains why, as is shown in FIG. 3, in the preferred configuration, the synchronising ring (1) is allowed to rotate and move axially around the nozzle axis. The support of the synchronising ring (1) on the nozzle structure (2) consists of preferably a cylindrical surface (14), that guaranties the concentric position between the synchronising ring (1) and the nozzle structure (2) on its rotation and radial displacement. Similarly the spherical end (5) of the angled lever arms can slide on the cylindrical surface (6) of the synchronising ring (1).

The rotation of the angled lever arms (3) is transmitted to the end of the compression struts (8), which in turn demands the rotation of the divergent petals (9) and therefore the opening or closure of the nozzle.

The following are alternative cinematic joints to the preferred configuration:

1. Spherical end of angled lever arms (3) on synchronising ring (1) slot, allowing axial displacement between elements. The synchronising ring (1) would not require axial displacement as it rotates.

Figure 5:
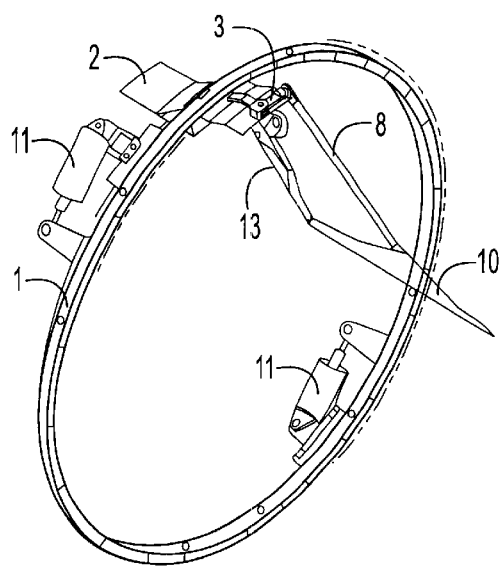
FIG. 5 is an isometric view of the invention mechanism, with the preferred synchronising ring actuation mechanism, which consists of two actuators in opposite ends of a diameter.

2. The joint of the angled lever arms (3) to the nozzle structure is made through a universal joint. The joint of the angled lever arm (3) to the synchronising ring (1) is made through a spherical joint with no cylindrical hole on ring and consequent sliding between elements 3. The angled lever arm (3) is joined to the nozzle structure through a universal joint that can displace parallel to the nozzle axis. The joint of the angled lever (3) arm to the nozzle structure is made through a spherical joint The preferred configuration for the actuation system (11) of the synchronising ring (1), preferably consists of two elements positioned at opposite ends of a diameter that compensate the torque produced under working conditions, FIG. 5. The described mechanism can also avoid the actuating mechanism (11), allowing control of exit nozzle area between stroke limits (15) through gas pressure on the divergent petals (10).

Figure 6A:
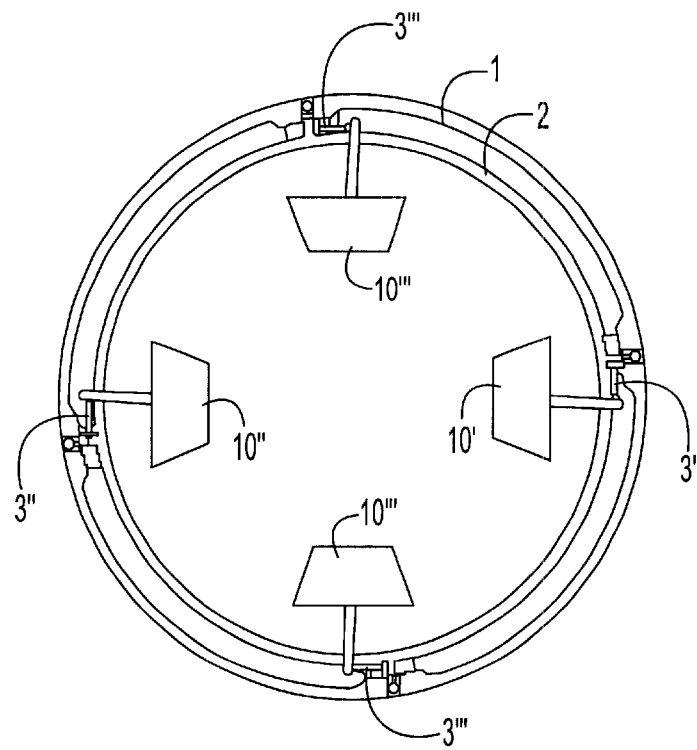
FIGS. 6a and 6b are rear views of the invention mechanism, in which the synchronising ring is displaced radially, adopting a non concentric position with the nozzle structure.
Figure 6B:
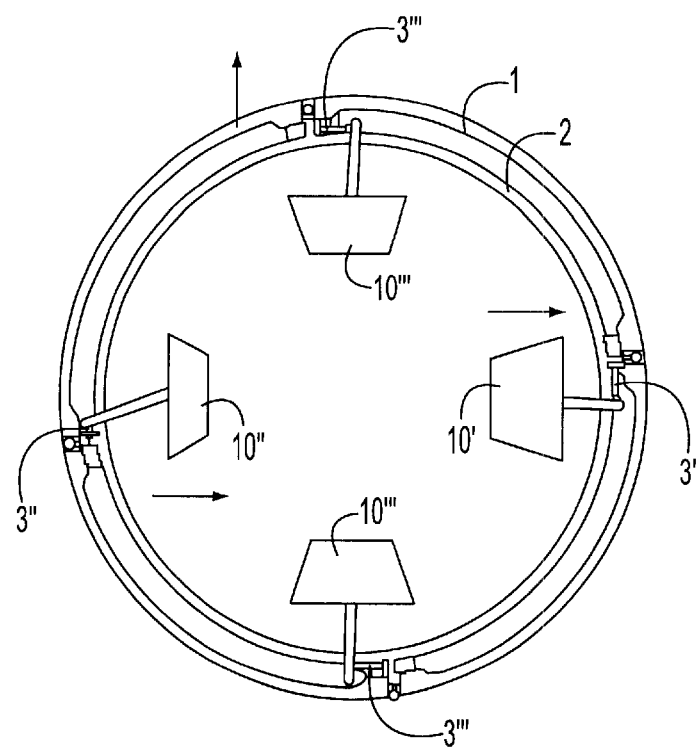

If the synchronising ring (1) described in FIG. 6a, is allowed to move radialy as shown in FIG. 6b, together with its rotation and consequent axial displacement around the nozzle structure (2), a non symmetric rotation of the angled lever (3) introduces a lateral component to the exiting gases. FIG. 6b shows how a vertically upwards radial displacement of the synchronising ring (1) demands a rotation of the angled lever arm at 90° (3') that causes the opening of the corresponding divergent petal (10'). The effect produced on the angled lever arm at 270° (3"), is the opposite, such that the corresponding divergent petal (10") closes. At 01 and 1801, the angled lever arms (3''') do not rotate, and therefore their corresponding divergent petals (10''') do not move. The final effect produced on the total number of petals is an exit gas vectorization by introducing a component in the 90° direction.

Technical advantages:

The proposed system provides a control system of the nozzle exit area which is independent of the throat area, simple, fail safe and has a small mass increment. The system always provides optimum gas expansion and therefore maximum thrust.

If the radial displacement of the synchronising ring (1) is allowed, the resulting mechanism achieves gas vectorization with the consequent gain in flying envelope and aeroplane manoeuvrability.

What is claimed is:

1. A mechanism for controlling the exit area of convergent-divergent nozzles, comprising a synchronising ring (1), concentric with the nozzle axis, joined to a group of angled lever arms (3) that pivot around an axis (4) on a nozzle structure (2), rotation of the synchronizing ring determining the position of a group of compression struts (8) which are joined at one side to said angled lever arms (3) by a pivot joint (7) and on their opposite ends to a group of divergent petals (10), said divergent petals (10) extending from a convergent portion of the nozzle such that for every circumferential position of the synchronising ring (1), the exhaust area of the nozzle is determined.

2. A mechanism according to claim 1, further comprising a double actuator actuation system (11) of the synchronising ring (1) that controls the exhaust area.

3. A mechanism according to claim 1, wherein the mechanism is configured to allow radial displacement of the synchronising ring (1), such that an asymmetry of the rotation of the angled lever arms (3) induces a lateral component on the exhaust gases.

4. A convergent-divergent nozzle with an exit area control mechanism comprising
   a nozzle structure;
   a plurality of convergent petals extending from pivot joints on the nozzle structure;
   a plurality of divergent petals connected to the convergent petals by pivot joints;
   a synchronising ring configured to rotate on the nozzle structure about a nozzle axis;
   a plurality of angled lever arms configured to pivot on the nozzle structure, each angled lever arm having a first end joined by a pivot joint to said synchronising ring and a second end; and
   a plurality of compression struts, each compression strut having a first end joined by a pivot joint to a second end of an angled lever arm and a second end joined by a pivot joint to one of said divergent petals.

5. A nozzle as recited in claim 4, further comprising at least one actuator mounted between the nozzle structure and the synchronising ring to induce rotation of the synchronising ring about the nozzle structure.

6. A nozzle as recited in claim 5, wherein a pair of actuators are mounted at diametrically opposed locations about the synchronising ring.

7. A nozzle as recited in claim 6, wherein the synchronising ring is movable in a transverse direction relative to the nozzle axis.

* * * * *